United States Patent
O'Halloran et al.

(10) Patent No.: US 8,180,532 B2
(45) Date of Patent: May 15, 2012

(54) VECTOR CONTROLLED LEVELING SYSTEM FOR A FORESTRY MACHINE

(75) Inventors: James O'Halloran, Hamilton (CA); Daniel Schulz, Morden (CA)

(73) Assignee: Deere & Company, Moline, IL (US)

( * ) Notice: Subject to any disclaimer, the term of this patent is extended or adjusted under 35 U.S.C. 154(b) by 779 days.

(21) Appl. No.: 12/302,060

(22) PCT Filed: May 23, 2007

(86) PCT No.: PCT/US2007/012378
§ 371 (c)(1),
(2), (4) Date: Nov. 24, 2008

(87) PCT Pub. No.: WO2007/139878
PCT Pub. Date: Dec. 6, 2007

(65) Prior Publication Data
US 2009/0118913 A1 May 7, 2009

Related U.S. Application Data

(60) Provisional application No. 60/803,290, filed on May 26, 2006.

(51) Int. Cl.
*B62D 33/073* (2006.01)
(52) U.S. Cl. ....... 701/49; 701/50; 280/6.154; 180/89.15
(58) Field of Classification Search ................ 701/49, 701/50, 124; 280/6.15, 6.151, 6.153, 6.154; 180/41, 89.14, 89.15; 144/4.1, 34.1, 34.3, 144/34.5, 34.6; 248/184.1
See application file for complete search history.

(56) References Cited

U.S. PATENT DOCUMENTS

| | | | | |
|---|---|---|---|---|
| 3,703,298 A | * | 11/1972 | Laverda | 280/6.154 |
| 4,114,666 A | * | 9/1978 | Bruun | 144/338 |
| 4,565,486 A | * | 1/1986 | Crawford et al. | 414/729 |
| 4,650,017 A | * | 3/1987 | Pelletier et al. | 180/9.1 |
| 5,180,028 A | * | 1/1993 | Perrenoud, Jr. | 180/235 |
| 5,337,847 A | * | 8/1994 | Woods et al. | 180/9.52 |
| 5,941,920 A | * | 8/1999 | Schubert | 701/37 |
| 6,173,973 B1 | | 1/2001 | Robinson | |

(Continued)

OTHER PUBLICATIONS

International Search Report and Written Opinion for PCT/US2007/012378 with a mailing date of Apr. 15, 2008.

*Primary Examiner* — Khoi Tran
*Assistant Examiner* — Spencer Patton
(74) *Attorney, Agent, or Firm* — Quarles & Brady LLP

(57) ABSTRACT

The present invention provides a leveling control system for a forestry machine (10) employing position sensors that relay information about the orientation of the carriage (12) in relation to the swing-house assembly (14) in order to control roll and pitch in a manner that maximizes the operating envelop of the leveling mechanism (38). The angles of pitch and roll of the swing-house assembly (14) in relation to the carriage (12) are measured and/or calculated and a controller (24) limits operation of the leveling mechanism (38) to an operating envelop that may be described in terms of pitch and droll. The cylinders (54, 56) are decelerated gradually as the operating envelop is approached. The controller (24) can include an automatic leveling mode. The controller (24) can change the function of the fore, aft, left and right operator controls so that they are true from the operator's frame of reference regardless of the rotary position of the cab relative to the carriage (12).

22 Claims, 9 Drawing Sheets

U.S. PATENT DOCUMENTS 6,241,263 B1    6/2001   Hicks
6,273,203 B1 *  8/2001   Paggi et al. ............... 180/89.13
6,609,581 B2    8/2003   Vaile
6,668,880 B2   12/2003   Nordstrom
7,198,125 B2 *  4/2007   Skelcher et al. ........... 180/89.13

* cited by examiner

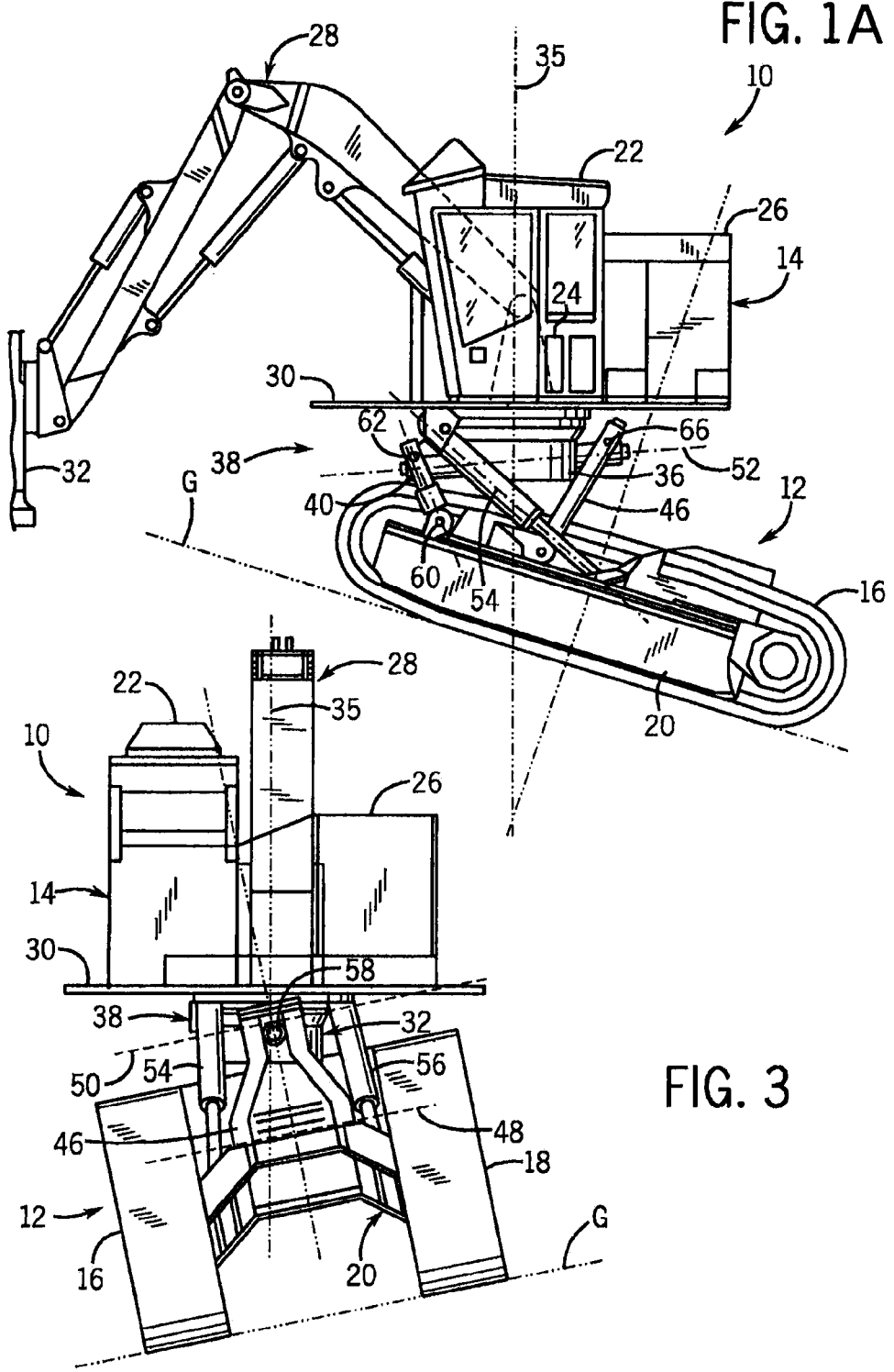

| i | $a_i$ | $d_i$ | $\alpha_i$ | $\theta_i$ |
|---|---|---|---|---|
| 1 | 0 | -513.32 | 90° | 90° |
| 2 | -610 | 900 | 90° | 90° - ROLL |
| 3 | -1452.532272 | 865 | 90° | 83.26° - PITCH |

VECTOR CONTROLLED LEVELING SYSTEM FOR A FORESTRY MACHINE

CROSS-REFERENCE TO RELATED APPLICATION

This application claims the benefit of U.S. Provisional patent application Ser. No. 60/803,290, filed on May 26, 2006, and entitled "Vector Controlled Leveling System," hereby incorporated by reference as if fully set forth herein.

STATEMENT CONCERNING FEDERALLY SPONSORED RESEARCH OR DEVELOPMENT

Not applicable.

FIELD OF THE INVENTION

This invention relates a leveling system for forestry equipment. This invention relates to a mechanism that connects a boom swing-house of a forestry machine to the frame of the ground engaging carriage of the machine, and more particularly to such a mechanism which is operated so as to level the swing-house in uneven or sloping terrain.

BACKGROUND OF THE INVENTION

Forestry machines for cutting, accumulating, processing and harvesting cut trees are well known in forestry operations. Typically, a forestry implement is mounted at the end of a boom or crane which has its other end mounted to a turntable so as to be pivotable about a lateral axis relative to the turntable. The turntable is mounted to a turntable support so as to be pivotable about a vertical axis (when the support is vertical). A carriage, which can have tracks or wheels for conveying the turntable support, has a frame to which the turntable support is mounted by a leveling mechanism. The leveling mechanism is operable to vary the position and orientation of the turntable support relative to the carriage, depending upon the slope of the terrain and the orientation of the carriage on the terrain. For example, if trees are being cut, harvested or processed on a hillside, the machine will typically be driven onto the hillside so the trees are within reach of the boom and the leveling mechanism adjusted to make the axis of the turntable generally vertical. The center of gravity of the swing-house assembly, which includes the boom (with cutting head attached), the engine of the machine, and the operator cab, which are mounted to the turntable, should be positioned relative to the carriage so that the machine does not tip forward or backward when the tree is cut or picked up/handled and its weight comes to rest on the butt plate of the head.

Such a mechanism may be made using linkages and hydraulic cylinders for moving linkages as described in U.S. Pat. No. 4,679,803, which is incorporated by reference as if fully set forth herein. In that mechanism, one set of links is provided forwardly and another set is provided rearwardly, and hydraulic cylinders connect the links both laterally and longitudinally to tilt the turntable relative to the carriage both about a lateral axis and a longitudinal axis. Other mechanisms for positioning and orienting the swing-house assembly are also discussed in U.S. Pat. No. 4,679,803.

U.S. Pat. No. 6,173,973, which is incorporated by reference as if fully set forth herein, is directed to a swing-house leveling mechanism for a forestry machine. The leveling mechanism is arranged between the swing-house assembly and the carriage. The leveling mechanism includes a front link and rear link that is shorter than the front link. Simultaneous extensions/retractions of hydraulic cylinders cause the turntable support of the swing-house assembly to move and tilt longitudinally, about a lateral axis relative to the carriage. Differential extensions/retractions of the cylinders cause the turntable support to tilt sideways. The forestry machine provides for the turntable to be rotatable relative to the turntable support about the turntable axis by 360° so that the boom of the machine can be operated in front of the carriage, in back of the carriage, or to either side at any angular position.

Leveling mechanisms must prevent the turntable support from contacting the undercarriage and must prevent damaging contact within the leveling mechanism itself. This can be achieved by using shortened hydraulic cylinders that don't allow the undercarriage and turntable support to contact in any cylinder orientation. Short cylinders, however, limit the operating envelope of the leveling mechanism.

Limit switches and/or cylinder stops can also be used to prevent damaging contact when using longer cylinders. For example, a limit switch can be employed to limit roll angle while allowing for long cylinders that provide greater pitch angles. However, limit switches abruptly cut off cylinder movement and create an operating envelope that is smaller than the operating envelope defined by actual interference/contact between the undercarriage and the turntable support.

The operator of a forestry machine normally controls a leveling mechanism via four command buttons for the directions fore, aft, left, and right, which directions apply to when the cab is directed forwardly relative to the carriage. The command buttons are usually logically connected to the leveling hydraulic cylinders so that the operator has to be aware of the orientation of the cab to the undercarriage. Operating the leveling mechanism on a slope can be especially difficult for even the most experienced operators because the cab where the operator sits may be rotated 360° in relation to the undercarriage.

SUMMARY OF THE INVENTION

The present invention provides a leveling control system for a forestry machine employing position sensors that relay information about the orientation of the carriage in relation to the swing-house assembly in order to control roll and pitch in a manner that maximizes the operating envelope of the leveling mechanism. The operating envelope of the leveling mechanism can be defined in terms of pitch and roll. The operating envelope can be a borderline plot of allowed pitch and roll combinations.

The pitch and roll angles can be measured by a plurality of angle sensors. In an alternate embodiment of the invention, the cylinder strokes can be measured and the pitch and roll angles calculated from the cylinder strokes.

In an alternate embodiment of the invention, the control system can have an automatic leveling mode that levels the swing-house assembly in relation to gravity while remaining within the operating envelope.

In an alternate embodiment of the invention, an angle sensor may provide information about the rotary orientation of the swing-house assembly in relation to the carriage and may translate operator commands so that the cab is the frame of reference instead of the carriage.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 1A is a side elevation view of a swing-to-tree feller/buncher illustrated on a slope, with the swing-house assembly tilted forwardly, the cutting head drawn in phantom and a portion of the track broken away;

FIG. 3 is a rear elevation view of the feller/buncher illustrated with the boom in front of the machine and with the swing-house assembly tilted to the right side;

DETAILED DESCRIPTION OF THE PREFERRED EMBODIMENT

Figure 1B:
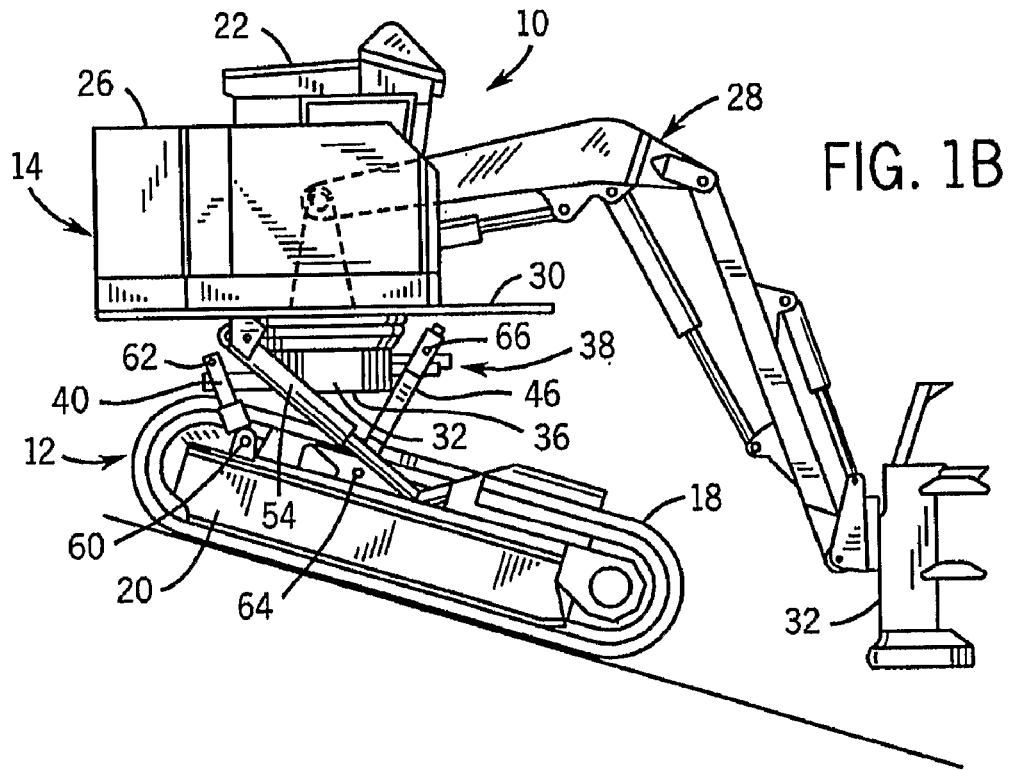
FIG. 1B is a view similar to FIG. 1A, but with the swing-house assembly rotated 180°, so as to be in position to cut a tree downhill from the machine.

FIG. 1A illustrates a swing-to-tree forestry machine 10, particularly a feller/buncher, which includes a carriage 12 and a swing-house assembly 14. The carriage 12 includes tracks 16 and 18 which engage the ground G and are mounted to a carriage frame 20 so as to propel the machine 10 when they are driven. The drive mechanism of the tracks 16 and 18 and general structure of the frame 20 are conventional, may be of any suitable type and are not discussed in detail here.

The swing-house assembly 14 includes a cab 22 in which the machine operator sits and controls the machine, a controller 24, an engine 26 which provides power for driving the carriage and the hydraulic systems of the machine 10, and a boom 28, all of which are mounted to a turntable 30. At the end of the boom 28 opposite from the cab 22, a cutting head 32 is mounted for severing a tree to be cut. Many different types of cutting heads are available, a high speed disc saw felling head being illustrated. Another type of device may be mounted to the end of the boom 28.

The turntable 30 is mounted to a turntable support 34 so as to be rotatable about a turntable major axis 35. A ball bearing connection may be used to provide this rotary connection. An internal gear may be fixed relative to the turntable support 34 and a hydraulic motor may be fixed to the turntable 30 so as to rotate a pinion which meshes with the internal gear. Driving the pinion along the gear serves to rotate the swing-house assembly 14 360° in either direction relative to the turntable support 34 (and thus the carriage 12). The angle of rotation of the swing-house assembly 14 in relation to the turntable support 34 can be measured by an angle sensor 36. The angle sensor 36 may be a rotary angle sensor, an encoder, a potentiometer, and/or a similar device. The connection of the turntable 30 to the turntable support 34 and the driving of the turntable 30 about the turntable major axis relative to the turntable support 34 are all conventional, and may be performed in any suitable way to practice the invention.

Figure 4:
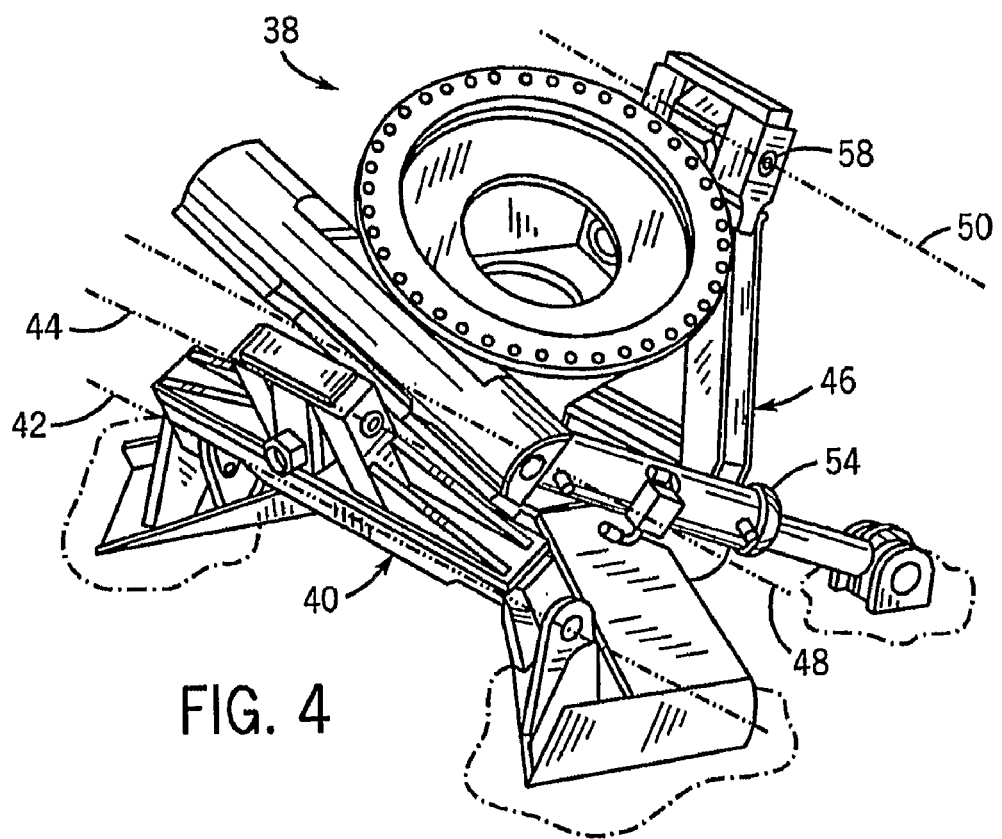
FIG. 4 is a fragmentary perspective view of a leveling mechanism for the machine of FIGS. 1-3.
Figure 2:
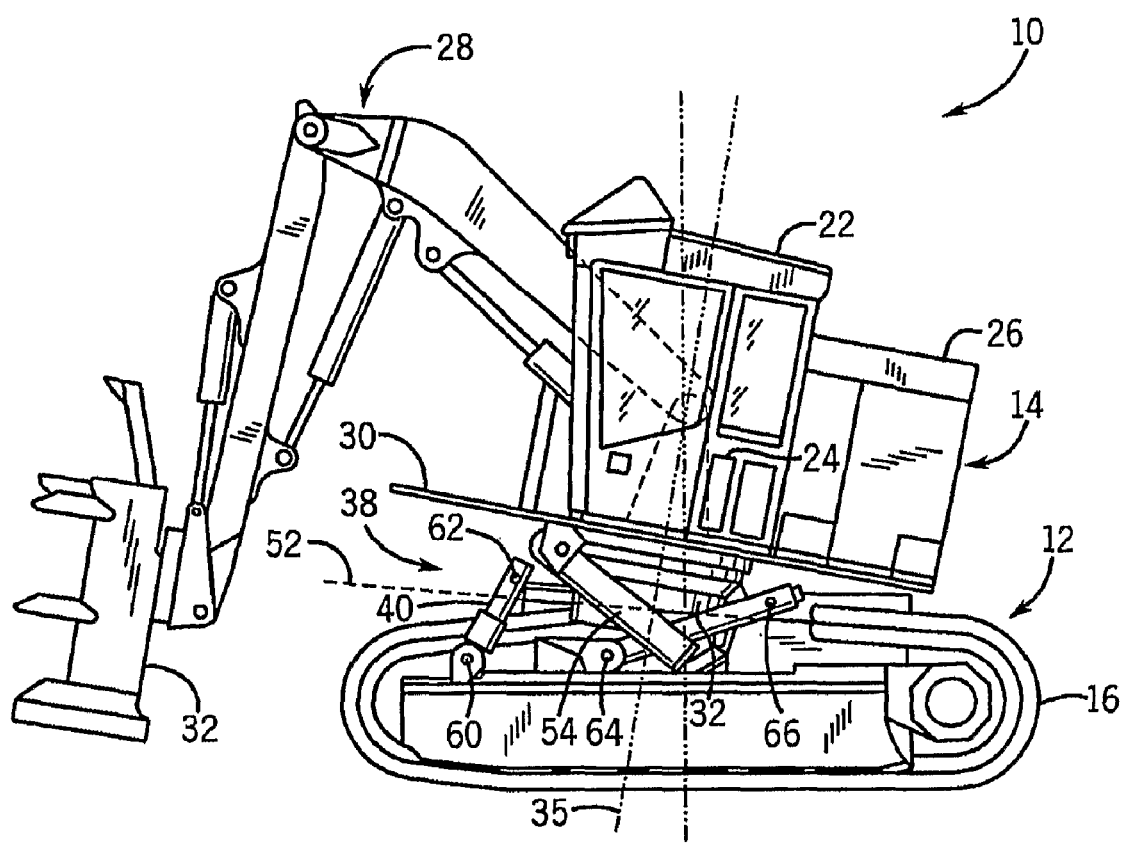
FIG. 2 is a side elevation view of the feller/buncher with the swing-house assembly tilted rearwardly.

FIG. 4 illustrates a leveling mechanism 38 for the machines of FIGS. 1-3 that changes the pitch and roll of the turntable support 34, and therefore the turntable 30 and the swing-house assembly 14, in relation to the carriage 12. A front link 40 is connected at its lower end to the carriage frame 20 and pivots about a lower lateral pivot axis 42. The upper end of the front link 40 is connected to the turntable support 34 and pivots about an upper lateral pivot axis 44. A rear link 46 is connected at its lower end to carriage frame 20 and pivots about a lower lateral pivot axis 48. The upper end of the rear link 46 is connected to the turntable support 34 and pivots about a rear upper lateral pivot axis 50. Pivoting the links 40 and 46 about their axes 42, 44, 48, and 50 affects changes to the pitch angle. The turntable support 34 is connected to the links 40 and 46 so that the turntable support 34 may pivot about a turntable minor axis 52. Pivoting about the turntable minor axis 52 affects changes to the roll angle.

The leveling mechanism 38 of the machines of FIGS. 1-4 includes a pair of laterally spaced hydraulic cylinders 54 and 56 that are connected to the carriage 12 to permit lateral and longitudinal pivoting. The cylinders 54 and 56 apply forces to the turntable support 34 so as to change the pitch of the turntable support 34 relative to the carriage 12, and also to rotate the turntable support 34 about a turntable minor axis 52 to change the roll relative to the carriage 12. The upper ends of the cylinders 54 and 56 may be connected by conventional ball joints to extensions of the turntable support 34. The ball joints permit lateral (side-to-side) and longitudinal (fore-and-aft) pivoting between the upper ends of the cylinders 54 and 56 and the extensions. This permits the turntable support 34 to be rotated about the turntable minor axis 52 by pressurizing the cylinders 54 and 56 so as to change their length relative to one another as illustrated in FIG. 3. Differential extension or retraction of the cylinders 54 and 56 causes changes in the roll angle of the turntable support 34 in relation to the carriage 12. When the cylinders 54 and 56 are extended or retracted in unison, the turntable support 34 is rotated about a lateral (side-to-side) axis either forwardly as illustrated in FIGS. 1A and 1B, or rearwardly as illustrated in FIG. 2. Extension or retraction of the cylinders 54 and 56 in unison will cause changes in pitch of the turntable support 34 in relation to the carriage 12 as illustrated in FIG. 3.

The roll and pitch of the turntable support 34 in relation to the carriage 12 of the machines of FIGS. 1-4 may be measured by angle sensors. A rotary angle sensor 58 measures the angle of the pivot about the turntable minor axis 52 thus measuring the roll angle directly and communicating the roll angle to the controller 24. The pitch angle can be calculated from the measured angles of the pivots about the lateral axes of the links 40 and 46. A rotary angle sensor 60 measures the angle of the pivot of the lower end of the front link 40 about the axis 42, rotary angle sensor 62 measures the angle of the pivot of the upper end of the front link 40 about the axis 44, rotary angle sensor 64 measures the angle of the pivot of the lower end of the rear link 46 about the axis 48, and rotary angle sensor 66 measures the angle of the pivot of the upper end of the link 46 about the axis 50. The angle sensors 60, 62, 64, and 66 communicate the measured angles to the controller 24 and the controller 24 calculates the pitch angle from the measured angles.

Figure 5:
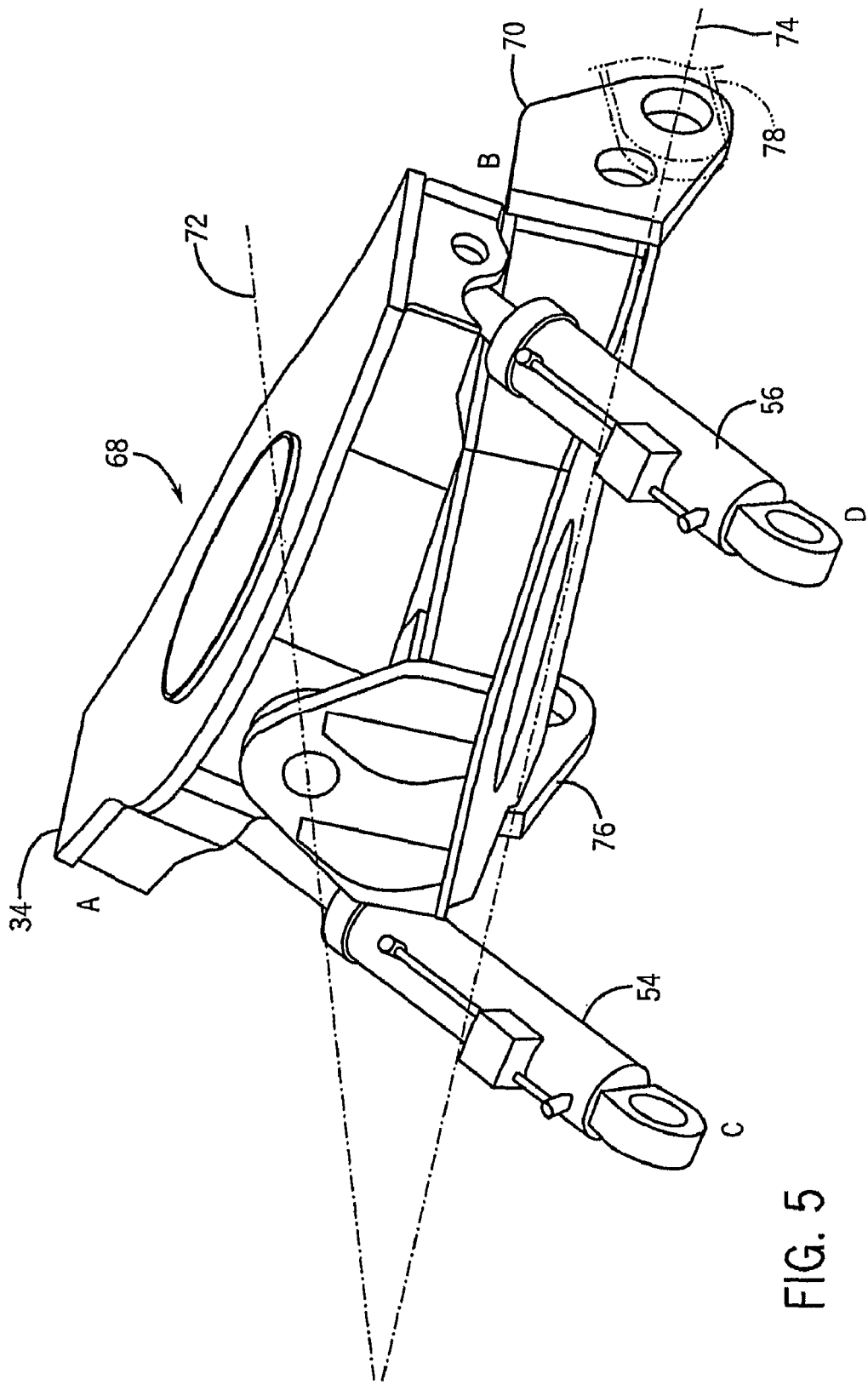
FIG. 5 is a perspective view of an embodiment of a leveling mechanism.

Referring to FIG. 5, a leveling mechanism 68 for a feller/buncher is shown. The leveling mechanism 68 includes a turntable support 34 pivotally connected to a lateral link 70 so as to be pivotable about an axis 72. The lateral link 70 is pivotally connected to the carriage (or to fixed links that are fixedly attached to the carriage) so as to be pivotable about an axis 74. A pair of laterally spaced hydraulic cylinders 54 and 56 are connected to the carriage to permit lateral and longitudinal pivoting. The upper ends of the cylinders 54 and 56 may be connected by conventional ball joints to the turntable support 34. The cylinders 54 and 56 apply forces to the turntable support 34 so as to rotate the lateral link, and thus the turntable support 34, about an axis 74 to change the pitch of the turntable support 34 relative to the carriage, and also to rotate the turntable support 34 about an axis 72 to change the roll relative to the carriage. Differential extension or retraction of the cylinders 54 and 56 causes changes in the roll angle of the turntable support 34 in relation to the carriage. Extension or retraction of the cylinders 54 and 56 in unison will cause changes in pitch of the turntable support 34 in relation to the carriage.

Referring to FIG. 5, a roll angle sensor 76 measures roll (left/right) and a pitch angle sensor 78 measures pitch (fore/aft). The angle sensors 76 and 78 may be rotary angle sensors (e.g., potentiometers) that are able to measure the roll and pitch directly. The angle sensors 76 and 78 communicate the roll and pitch information to the controller 24. Roll angle sensor 76 senses the roll and sends an analog electric signal between 0.5 V and 4.5 V to the controller 24 communicating the roll information. Pitch angle sensor 78 senses the pitch and sends an analog electric signal between 0.5 V and 4.5 V to the controller 24 communicating the pitch information. The roll and pitch information may be displayed in degrees on a display in the cab 22. The operator can calibrate the angle sensors 76 and 78 by selecting a reference mode and then move the leveling mechanism 68 into reference positions (e.g., the fully retracted position and the fully extended position). During the reference mode, the controller 24 can be configured to operate the leveling mechanism 68 at a reduced speed. In an embodiment, the reference mode can be entered automatically upon commissioning or reprogramming of the controller 24. In an embodiment, only the pitch can be controlled during the reference mode (i.e., controller 24 prohibits differential extension of cylinders 54 and 56).

For various feller/bunchers, the roll and pitch angles of turntable support 34 relative to the carriage 12 can also be calculated by measuring the pitch and roll of the turntable support 34 relative to the ground, measuring the pitch and roll of the carriage 12 relative to the ground, and calculating from those measurements the pitch and roll of the turntable support 34 relative to the carriage 12. Roll and pitch angles could also be measured and/or calculated by encoders, potentiometers, and/or other similar devices.

The controller 24 controls the cylinders 54 and 56. The controller 24 can be a computer. The cylinders 54 and 56 are connected to proportional valves (not shown) driven via pulse-width modulation (PWM) output signals sent by the controller 24. Smooth hydraulic movement can be achieved by increasing/decreasing the current supplied to the cylinders 54 and 56 using acceleration/deceleration ramps.

The controller 24 ensures that the leveling mechanism 68 does not operate outside of an operating envelope 80. Operating envelope 80 is defined by the mechanical dimensions of the leveling mechanism 38 as well as the requirement that the turntable 30, swing-house assembly 14, and/or other parts of the machine 10 must be prevented from contacting the carriage 12, the tracks 16 and 18, and/or other parts of the machine 10. The operating envelope of different feller/bunchers (or other machines) will vary depending on the configuration of the machine and design concerns. An operating envelope can be defined in terms of pitch angle and roll angle, lengths of the cylinders 54 and 56, and/or any other such system that describes limits of operation.

Figure 6:
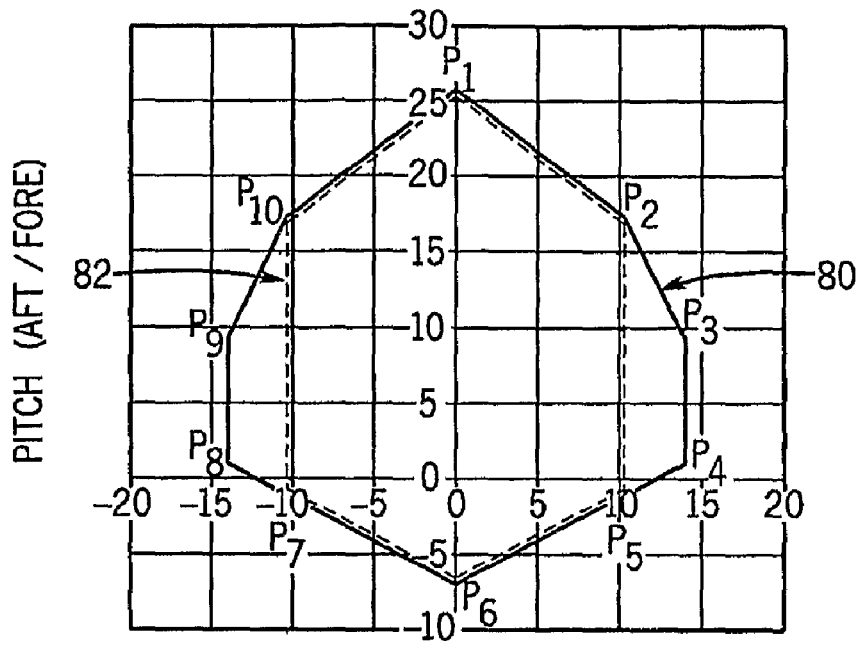
FIG. 6 is a graphical representation of an operating envelope allowed for by an embodiment of the present invention and of a prior art operating envelope.

Referring to FIG. 6, a graphical representation of an operating envelope 80 of a feller/buncher employing an embodiment of the invention and of an operating envelope 82 of a feller/buncher employing limit switches are shown. The graph shows the combinations of pitch (aft/fore) and roll (left/right) allowed. An operating envelope 80 of a feller/buncher employing an embodiment of a control system of the present invention is shown by the line defined by limit points $P_1$-$P_2$-$P_3$-$P_4$-$P_6$-$P_8$-$P_9$-$P_{10}$-$P_1$, which is a borderline plot of allowed combinations of pitch and roll that is symmetric about the pitch axis. An operating envelope 82 for the same feller/buncher using limit switches is shown by the line $P_1$-$P_2$-$P_5$-$P_6$-$P_7$-$P_{10}$$P_1$. Operating envelope 82 is smaller than operating envelope 80 because it is restricted by the operation of the limit switches. For example, the limit switches restrict the roll to one roll value along vertical lines $P_2$-$P_5$ and $P_7$-$P_{10}$ even though there are allowable roll and pitch combinations to the right of line $P_2$-$P_5$ and to the left of line $P_7P_{10}$ (i.e., allowable roll and pitch combinations including increased roll magnitude). As shown in FIG. 6, Line $P_2$-$P_3$-$P_4$-$P_5$ defines more allowable pitch and roll combinations between a range of pitches than line $P_2$-$P_5$ does for the same range of pitches. To increase the maximum allowed roll, it can be necessary to limit the pitch angle for larger roll angles to avoid destructive mechanical interference. For example, an interference would occur if the feller/buncher was at $P_2$ and the roll was increased in magnitude without reducing the pitch in magnitude. A similar problem would occur for $P_{10}$ because the operating envelope 80 is symmetric across the pitch axis. As discussed below, when the feller/buncher is at $P_2$ and commanded to increase the roll, the feller/buncher operates along line $P_2$-$P_3$-$P_4$ thereby allowing for increased roll. In an embodiment of the present invention, operating envelope 80 is as large as possible to allow for the minimum clearance of the mechanical parts of the feller/buncher. The operating envelopes are shown as lines but may be curved and/or have fewer lines. The optimal operating envelope depends on machine configuration.

Figure 7:
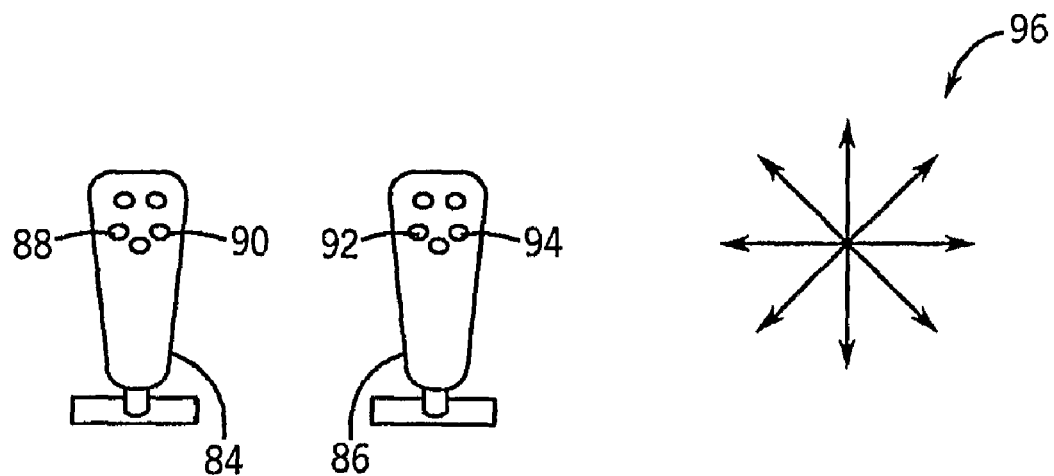
FIG. 7 shows a front view of a set of operator controls and a graphical representation of the control pattern for the operator controls.

Referring to FIG. 7, operator inputs 84 and 86 are located in the cab and are communicatively connected to the controller 24 (not shown). Operator inputs 84 and 86 allow the operator to command the controller 24 to change the pitch and roll by operating the cylinders 54 and 56 of the leveling mechanism 38 within the operating envelope 80. The operator inputs 84 and 86 are shown as joysticks, but could be any input device. Operator input 84 includes a fore control button 88 and an aft control button 90 so that the operator can command the controller 24 to change pitch in the fore and aft directions. Operator input 86 includes a left control button 92 and a right control button 94 so that the operator can command the controller 24 to change the roll in the right and left directions. Combinations of directions can be commanded as long as the directions are not opposite. A control pattern of command directions 96 is shown in FIG. 6. The arrangement of the operator inputs and control buttons may be rearranged and/or configured in any way that allows the operator to command the controller 24 to change pitch and roll.

The controller 24 interprets the operator command from the operator inputs 84 and 86 along with measured roll and pitch information to determine how to operate the cylinders 54 and 56 in order to change pitch and roll.

Figure 8:
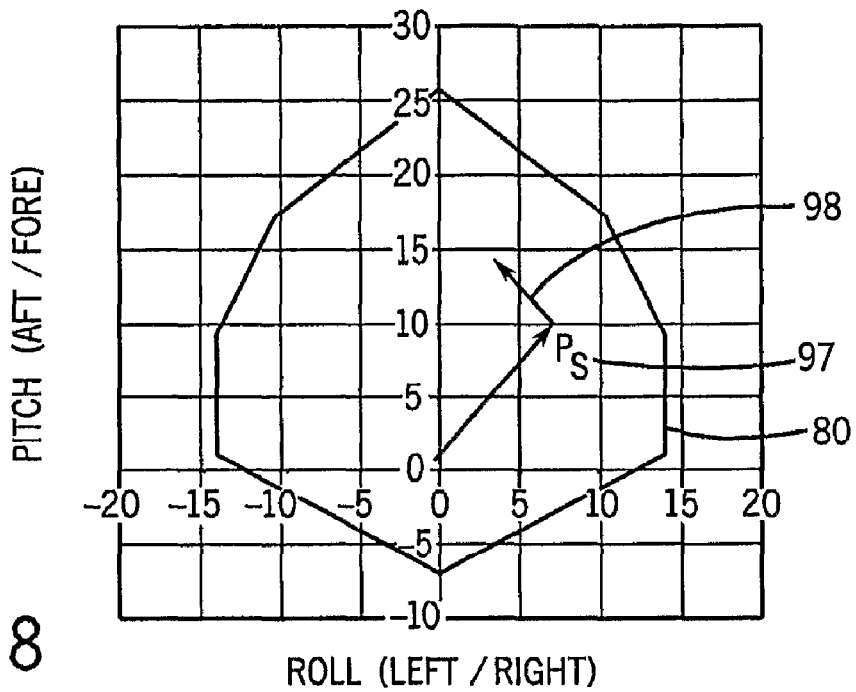
FIG. 8 is a graphical representation of an operator command vector within an operating envelope.

Referring to FIG. 8, the controller 24 reacts to an operator command by evaluating the current position $P_s$ 97 of the leveling mechanism 38 or 68 with respect to the desired direction of movement command vector 98. The command vector 98 is evaluated for direction and speed. The length of command vector 98 indicates the speed at which to move. The currents provided to the proportional valves operating the cylinders 54 and 56 can be calculated to cause the leveling mechanism 38 to move in the direction indicated by the operator. Once the leveling mechanism 38 is moving, the direction of movement is verified by evaluating the roll and pitch information provided by or calculated from the angle sensors. This closed loop control keeps the leveling mechanism 38 moving on the line determined by $P_s$ 97 and the command vector 98.

Figure 9:
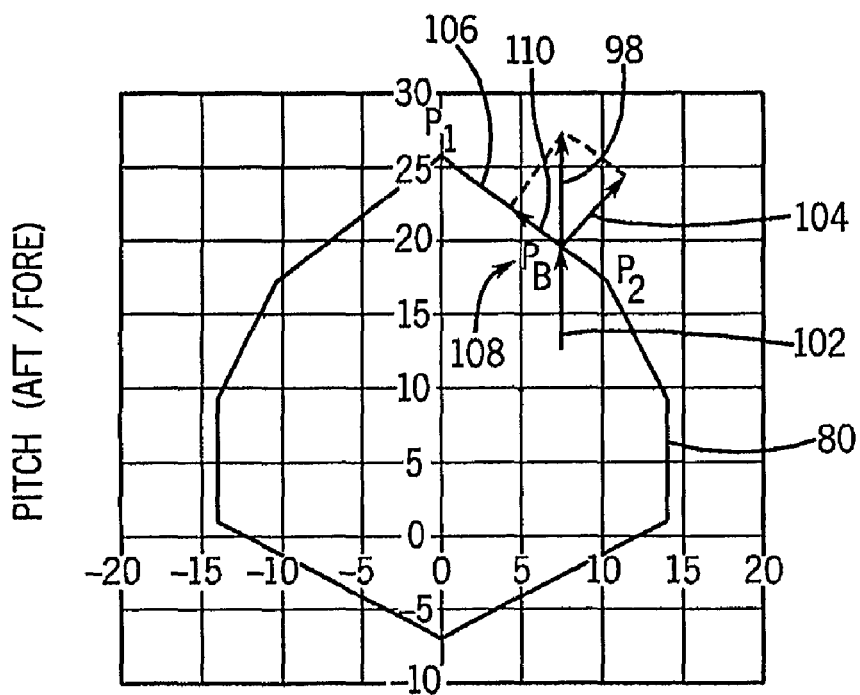
FIG. 9 is a graphical representation of an operator command vector extending outside of an operating envelope and operation within the operating envelope.

The controller 24 also must prevent the leveling mechanism from operating outside of the operating envelope 80 by monitoring the measured/calculated pitch and roll angles, determining whether the pitch and roll angles are within the operating envelope 80, determining towards which border of the operating envelope 80 the operator has commanded movement, and controlling the cylinders 54 and 56 to keep the pitch and roll angles within the operating envelope 80. When approaching the borders of the operating envelope 80, the controller 24 cushions the movement of the cylinders 54 and 56 in order to prevent mechanical stress on the cylinders 54 and 56 as well as on other parts of the machine 10 (i.e., decelerates movement). Referring to FIG. 9, to cushion the movement, the controller 24 determines towards which borderline segment 106 of the operating envelope 80 the cylinders 54 and 56 are moving. The command vector 98 comprises an allowable command vector 102 that is within the operating envelope 80 and a forbidden command vector 104 that is outside of the operating envelope 80. The allowable command vector 102 points towards the borderline segment 106. A point of intersection $P_b$ 108 with the borderline segment 106 is calculated and the distance to the point of intersection 108 is monitored. A corrected command vector 110 parallel to the borderline segment 106 is then calculated. The corrected command vector 110 will determine the new direction and speed to travel. A position to begin deceleration to a slower speed is calculated so that the speed is ramped down before reaching point of intersection 108. Once the point of intersection 108 is met, the cylinders 54 and 56 are controlled according to the corrected command vector 110 so that the cylinders 54 and 56 operate within the operating envelope 80. The corrected command vector 110 will then be evaluated to determine if it is approaching another borderline and the closed loop control continues. If the borderline segment 106 is approached perpendicularly, movement will controlled to gradually come to a stop at the point of intersection.

Figure 10:
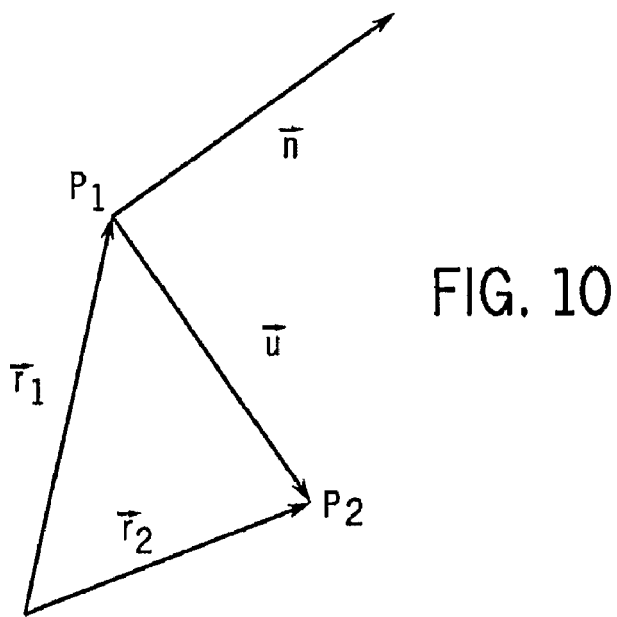
FIG. 10 is a graphical representation of a normal vector to a borderline of an operating envelope.
Figure 11:
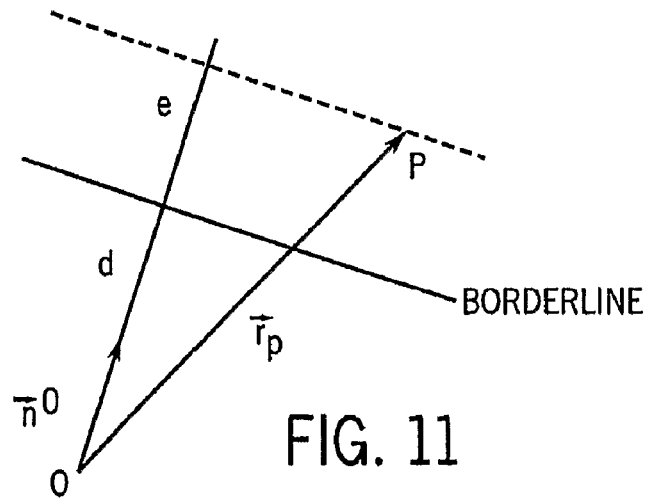
FIG. 11 is a graphical representation of calculating a distance to a borderline of an operating envelope from a point inside of the operating envelope.

The position and orientation of the leveling mechanism can be mathematically described by forward kinematic equations derived using the Denavit-Hartenberg convention. The pitch and roll angles, measured by the angle sensors and/or calculated from the measured angles, can be plugged into the forward kinematic transformation and equations to calculate the position and orientation of the cylinders 54 and 56. Referring to FIG. 10, the Denavit-Hartenberg representation for the leveling mechanism 68 of FIG. 5 is shown. FIG. 5 indicates the location of the points A, B, C, and D. The Denavit-Hartenberg transformation matrix is shown in FIG. 11. The top end positions of the cylinders are:

$$\vec{r}_A = \begin{pmatrix} 203 \\ 775 \\ -343 \end{pmatrix} \text{ and } \vec{r}_B = \begin{pmatrix} 203 \\ -775 \\ -343 \end{pmatrix}$$

The bottom end positions of the cylinders are:

$$\vec{r}_c = \begin{pmatrix} a_3\sin(\theta_3) + d_2 \\ a_3\cos(\theta_2)\cos(\theta_3) + d_3\sin(\theta_2) + a_2\cos(\theta_2) \\ a_3\sin(\theta_2)\cos(\theta_3) - d_3\cos(\theta_2) + a_2\sin(\theta_2) + d_1 \end{pmatrix} \text{ and}$$

$$\vec{r}_D = \begin{pmatrix} a_3\sin(\theta_3) + d_2 \\ a_3\cos(\theta_2)\cos(\theta_3) - d_3\sin(\theta_2) + a_2\cos(\theta_2) \\ a_3\sin(\theta_2)\cos(\theta_3) + d_3\cos(\theta_2) + a_2\sin(\theta_2) + d_1 \end{pmatrix}$$

The position and orientation of the cylinders 54 and 56 may also be measured by sensors such as an encoder, potentiometer, linear variable displacement transducer, ultrasonic sensor, infrared sensor, and/or a similar device. In a further embodiment of the invention, the position and orientation of the cylinders 54 and 56 can be measured and pitch and roll angles may be calculated by plugging the measured length of the cylinders into reverse kinematic equations derived using the Denavit-Hartenberg convention.

Referring to FIGS. 10 and 11, the borderline segment 106 between the first two corner points is given by the vector $\vec{u}$ where:

$$\vec{r} = \vec{r}_1 + \lambda(\vec{r}_2 - \vec{r}_1) = \vec{r}_1 + \lambda\vec{u} \text{ with } 0 \leq \lambda \leq 1 \text{ and}$$

$$\vec{u} = \vec{r}_2 - \vec{r}_1.$$

All other segments of the operating envelope 80 can be calculated in a similar manner as well. For calculation purposes, it is convenient to know a vector $\vec{n}$ that is perpendicular to the borderline segment 106.

$$\vec{n} = \begin{bmatrix} 0 & -1 \\ 1 & 0 \end{bmatrix} \vec{u} = \begin{pmatrix} -y_u \\ x_u \end{pmatrix}$$

With $\vec{n}$, the borderline can now be described as $$\vec{n}\vec{r} - \vec{n}\vec{r}_1 = 0 \text{ or as}$$

$$\vec{n}^0\vec{r} - \vec{n}^0\vec{r}_1 = \vec{n}^0\vec{r} - d = 0, \text{ where}$$

$$\vec{n}^0 = \frac{\vec{n}}{|\vec{n}|}$$

Where $\vec{n}^0$ has the length of 1 unit and d represents the distance of the borderline segment 106 from the origin of the coordinate system. The distance between any point P and a borderline segment can be calculated as:

$$-e = \vec{n}^0 \vec{r}_P - d$$

$$\Leftrightarrow e = d - \vec{n}^0 \vec{r}_P$$

If the value for e is positive, then point P and the origin are located on the same side of the borderline; and if the value for e is negative, then point P and the origin are located on different sides of the borderline.

Knowing the current position $P_S$, where movement starts from, and the command vector $\vec{c}$, the path of movement will be:

$$\vec{r} = \vec{r}_S = \mu \vec{c}$$

To find the borderline crossing point $P_B$, a linear equation is resolved:

$$\vec{r} = \vec{r}_S + \mu\vec{c} \wedge \vec{n}\vec{r} - \vec{n}\vec{r}_1 = 0$$

$$\Rightarrow \vec{n}\vec{r}_S + \mu\vec{n}\vec{c} - \vec{n}\vec{r}_1 = 0$$

$$\Rightarrow \mu = \frac{\vec{n}\vec{r}_1 - \vec{n}\vec{r}_S}{\vec{n}\vec{c}}$$

If $\vec{n}\vec{c}$ equals zero, $\mu$ is not defined because the path of movement and the borderline are parallel, thus there is no crossing point. Knowing $P_B$, $\lambda$ can be checked to determine whether it is part of a borderline segment.

$$\vec{r} = \vec{r}_S + \mu\vec{c} \wedge \vec{r} = \vec{r}_1 + \lambda\vec{u}$$

$$\Rightarrow \vec{r}_S + \mu\vec{c} = \vec{r}_1 + \lambda\vec{u}$$

$$\Rightarrow \lambda = \frac{\vec{r}_S + \mu\vec{c} - \vec{r}_1}{\vec{u}}$$

$$\Rightarrow \lambda = \frac{x_S + \mu x_C - x_1}{x_U} \bigvee \lambda = \frac{y_S + \mu y_C - y_1}{y_U}$$

Either $x_U$ or $y_U$ have to be different from zero to obtain a solution. If $P_B$ is part of a borderline segment, then:

$$0 \leq \lambda \leq 1.$$

To determine towards which borderline the command vector is moving, the following conditions need to be checked:

$\mu \geq 0$ or $\vec{n}\vec{c} > 0$, since $P_B$ needs to lay on the path in forward direction and $0 \leq \lambda \leq 1$, to examine if $P_B$ is part of borderline segment and $e \geq 0$ for all borderlines, to verify that the operating envelope has not been crossed.

Figure 12:
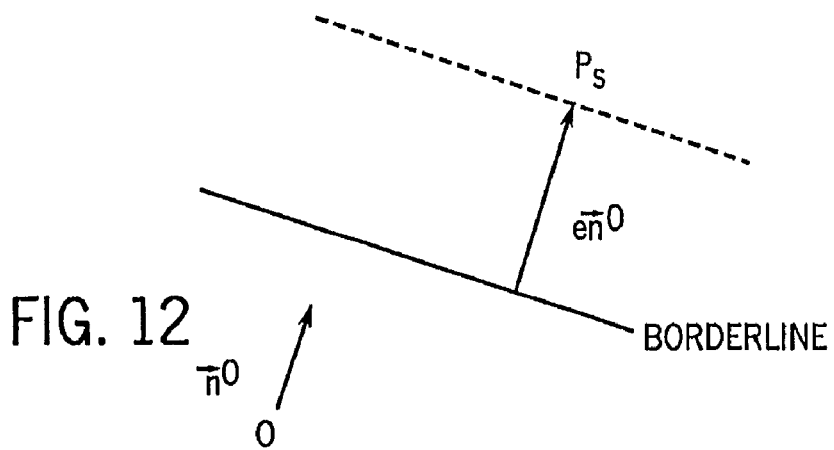
FIG. 12 is a graphical representation of calculating a distance to a borderline of an operating envelope from a point outside of the operating envelope.

Referring to FIG. 12, if the machine is operating outside of the operating envelope, the shortest path to the operating envelope can be calculated by:

$$\vec{r}_B = \vec{r}_S + e\vec{n}^0 = \vec{r}_S + e\frac{\vec{n}}{|\vec{n}|}$$

For the proposed $P_B$, the $\lambda$ is calculated for the borderline segments. If $\lambda$ is outside the range of zero to one, the corner point between the two segments is chosen, where $\lambda_i > 1$ and $\lambda_{i+1} < 0$ as the closest point to reenter the operating envelope.

If the command vector would cause the leveling mechanism to operate outside the operating envelope, the movement will be controlled so as to move from the start position to the border point, and from there movement will be along the operating envelope limits to a corner point and then to the next corner point as long as $\vec{n}\vec{c} > 0$ and as long as the same direction is maintained:

$\vec{u}\vec{c} > 0$, when moving clockwise or $\vec{u}\vec{c} < 0$, when moving counterclockwise.

The magnitude of the command vector $\vec{c}$ represents 100% of the requested speed, and the reduced speed along a borderline is given by:

$$\vec{u}^0\vec{c} = \frac{\vec{u}\vec{c}}{|\vec{u}|}.$$

Figure 13:
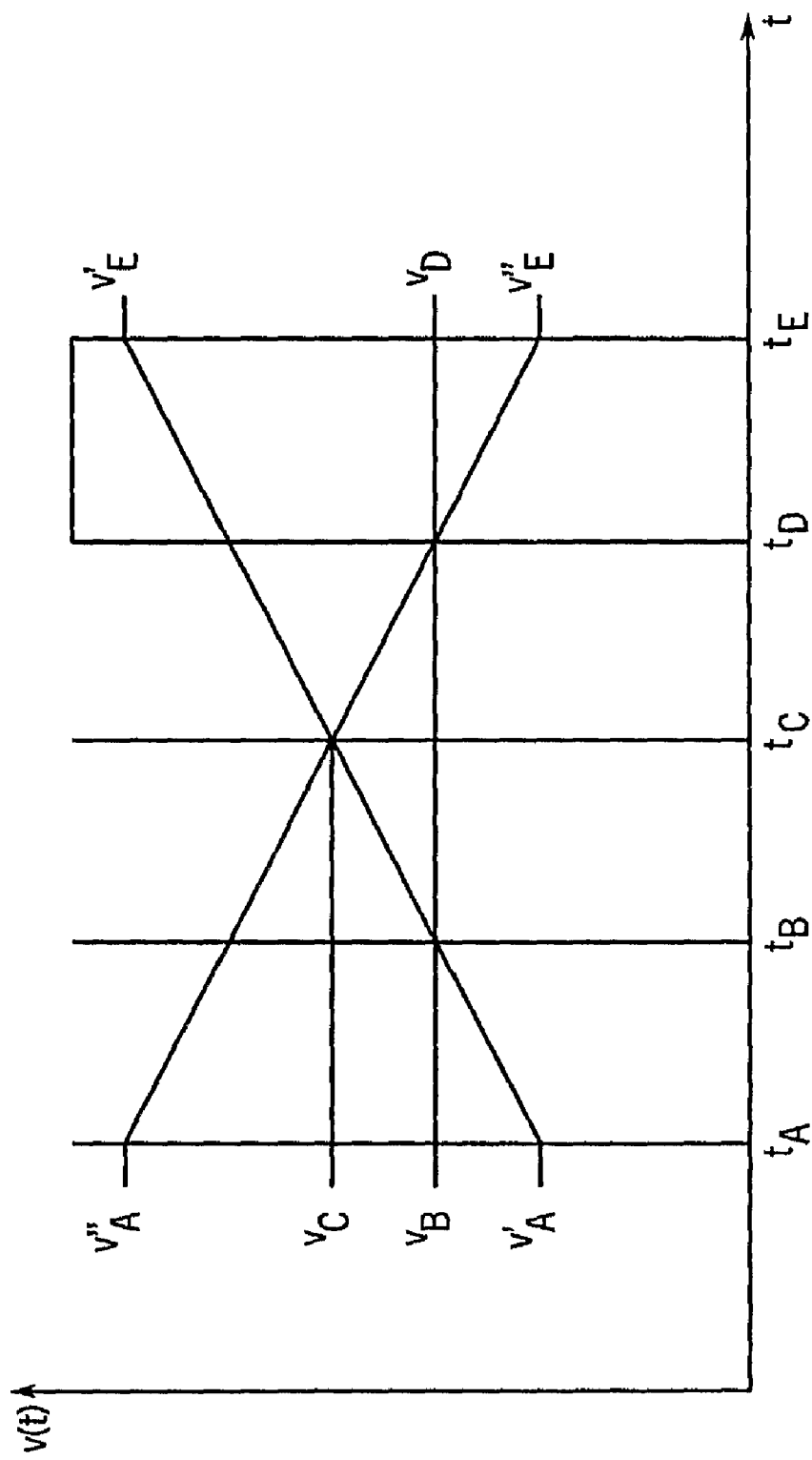
FIG. 13 is a graphical representation of the speed of cylinder movement over time for a path of a leveling mechanism.
Figures 14, 15:
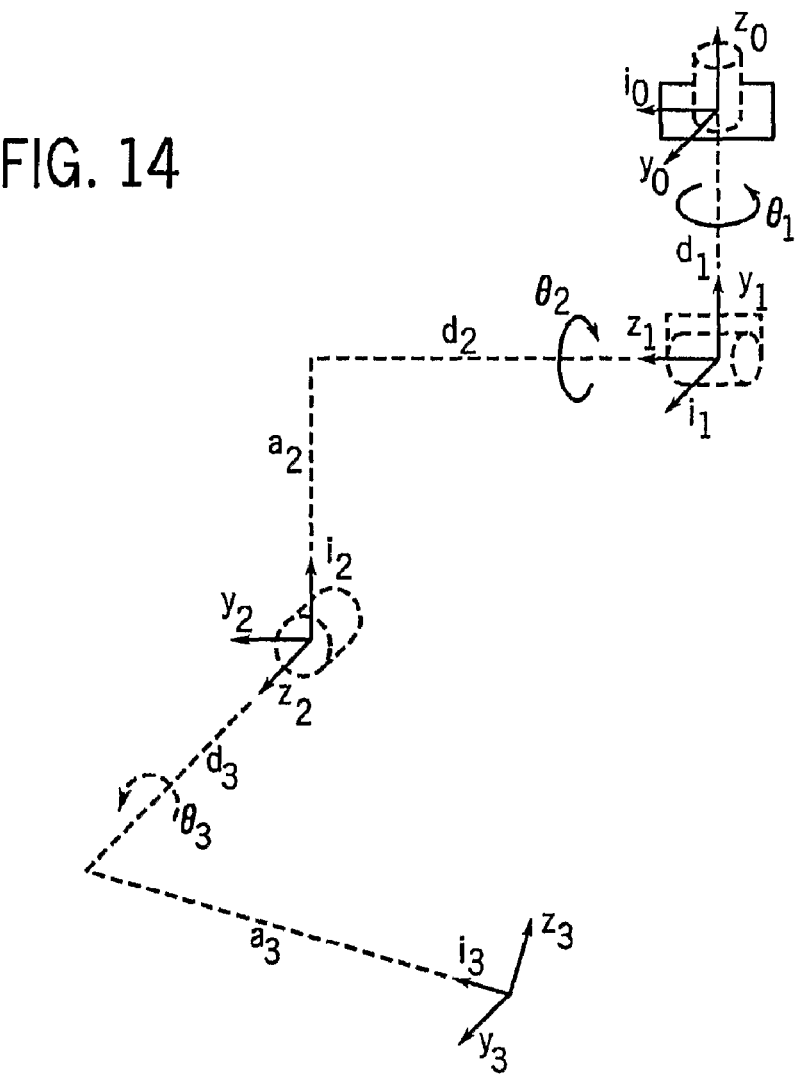
FIG. 14 is a Denavit-Hartenberg representation of a leveling mechanism.
FIG. 15 is a Denavit-Hartenberg table for the Denavit-Hartenberg representation of FIG. 14.

Referring to FIG. 13, because movement of the cylinders 54 and 56 and movement of the turntable support 34 do not relate in a linear way, speed, acceleration, and deceleration are defined in the roll/pitch plane. The deceleration rate used when approaching a borderline segment 106 of the operating envelope 80 (this deceleration is called electronic cushioning), is different than the deceleration rate used for command stops. The maximum speed level on a movement path will be less than 100% if the movement is along the borderline in a different direction than the original command vector 98. Due to the length of the individual path sections, maximum speed may not be reached before deceleration must occur. Speed is zero at the beginning and at the end of the path; therefore, deceleration must occur somewhere in between to ensure that the speed is ramped down in time. The general formulas for the speed calculations are:

$$v_2 = v_1 + a(t_2 - t_1)$$

$$s_2 = s_1 + v_1(t_2 - t_1) + \frac{1}{2}a(t_2 - t_1)^2$$

The entry and exit positions $s_A$ and $s_E$ can be calculated by calculating the path. Speed $v_B = v_D$, which is the maximum speed level for this particular path section, can be calculated. Speed $v_A$ at entry point will always be the minimum of $v_A'$ and $v_A''$ and speed $v_E$ at exit point is always the minimum of $v_E'$ and $v_E''$. The required speeds are calculated as:

$$v_1 = \sqrt{v_2^2 - 2a(s_2 - s_1)} \text{ and } v_2 = \sqrt{v_1^2 + 2a(s_2 - s_1)}$$

The achievable speed on this section will be the minimum of $v_B = v_D$ and $v_C$.

$$v_C = \sqrt{\frac{2a'a''}{a'' - a'}\left(s_E - s_A + \frac{v_A^2}{2a'} - \frac{v_E^2}{2a''}\right)}$$

Knowing all speeds $v_A \ldots v_E$, the corresponding $s_B \ldots s_D$ can be calculated:

$$v \neq const: \; s_1 = s_2 \frac{v_2^2 - v_1^2}{2a} \text{ and } s_2 = s_1 + \frac{v_2^2 - v_1^2}{2a}$$

as well as the time stamps:

$$v \neq const: \; t_1 = t_2 - \frac{v_2 - v_1}{a} \text{ and } t_2 = t_1 + \frac{v_2 - v_1}{a}$$

$$v = const: \; t_2 = t_1 + \frac{s_2 - s_1}{v}$$

As described above, lengths (=vector in left/right cylinder plane) of the cylinders 54 and 56 can be calculated. The command vector 98 represents a delta vector in the roll/pitch plane; therefore, the related delta vector in the left/right cylinder plane can be calculated:

$$\Delta \vec{s} = DH(\Delta \vec{c}) \text{ with } \vec{c} = \begin{pmatrix} \alpha_{roll} \\ \alpha_{pitch} \end{pmatrix} \text{ and } \vec{s} = \begin{pmatrix} s_{Cyl\_left} \\ s_{Cyl\_right} \end{pmatrix}$$

This delta vector and the speed information can be used to calculate the proper currents to the proportional valves.

To avoid the accurate but heavy Denavit-Hartenberg calculation, the current ratio between the cylinders 54 (left cylinder) and 56 (right cylinder) can be approximated by a function $f(x)=a*\sin(x+b)$, which can further be approximated by Taylor series:

$$\text{factor}_L = 1.22 \cdot \sin(\text{dir} + 0.95)$$

$$\text{factor}_R = 1.22 \cdot \sin(\text{dir} + \pi - 0.95)$$

The factors are the ratios with regard to the currents required to go from aft to fore, dir represents the direction (0°=aft to fore, 90°=left to right). The direction will usually be known from the command vector 98; therefore, the equations can be simplified to be:

$$\begin{pmatrix} \text{factor}_L \\ \text{factor}_R \end{pmatrix} = 1.22 \cdot \begin{bmatrix} \cos(-0.95) & -\sin(-0.95) \\ \cos(\pi + 0.95) & -\sin(\pi + 0.95) \end{bmatrix} \cdot \frac{\vec{c}}{|\vec{c}|}$$

In extreme cases, these factors might be off by up to 0.4 compared to the ones calculated with the Denavit-Hartenberg convention. Closed loop control can compensate for the approximation error.

Under certain conditions the hydraulic flow to the cylinders will be at a maximum and the current will need to be corrected to stay on path. This issue shall be overcome by closed loop position control.

Alternatively, the operating envelope 80, minus a slowdown margin, could be stored in a look-up table, and the pitch and roll angles continuously monitored so that the controller 24 arrests control from the operator when the slow-down margin is entered, and the controller 24 slows down and stops the cylinders 54 and 56 before any contact is made between parts of the machine 10.

In another alternative, the controller 24 could be provided with an automatic mode and a level sensor provided on the cab 22. The level sensor and controller 24 would control the cylinders 54 and 56 to keep the cab 22 level relative to gravity, and the equations discussed above or the look-up table would be used to keep the cab-to-carriage orientation inside the operating envelope, using virtual cushioned stops as discussed above.

Referring to FIGS. 1A and 1B, angle sensor 36 measures the orientation of the swing-house assembly 12 in relation to the carriage 12 and provides the angle of rotation to the controller 24. With this angle information, the controller 24 can recalculate the operator's commands from the control buttons 88, 90, 92, 94 so that the operator becomes the frame of reference for the commanded directions (e.g. pushing the fore button will cause the leveling mechanism 38 to move in a direction in front of the cab 22 instead of in the direction towards the front of the carriage 12). The cab 22, and therefore the operator, is the frame of reference instead of the carriage 12. The operator does not have to have visual contact with the carriage 12 in order to determine which control button 88, 90, 92, 94 to push in order to operate the leveling mechanism 38 in a certain direction.

Preferred embodiments of the invention have been described in considerable detail. Many modifications and variations to the embodiments described will be apparent to those skilled in the art. Therefore, the invention should not be limited to the embodiments described, but should be defined by the claims that follow.

We claim:

1. A forestry machine comprising:
   a cab;
   a boom;
   a forestry implement mounted to the boom;
   a swing-house assembly supporting the cab and boom;
   a turntable assembly supporting the swing-house assembly, the swing-house assembly rotatable about the turntable assembly;
   a carriage configured for off-road travel;
   a leveling mechanism mounted to the carriage and supporting the turntable assembly, the leveling mechanism including a plurality of hydraulic cylinders configured to reposition the turntable assembly relative to the carriage;
   a first sensor configured to sense a first parameter related to an orientation of the turntable assembly relative to the carriage;
   a second sensor configured to sense a second parameter related to the orientation of the turntable assembly relative to the carriage;
   an operator input device positioned in the cab, the operator input device configured to generate a command signal; and
   a controller programmed with an operating envelope, the controller configured to determine a pitch from at least the first parameter, determine a roll from at least the second parameter, receive the command signal and control the leveling mechanism as directed by the command signal and keep the leveling mechanism within the operating envelope by continuously monitoring the pitch and roll and prohibiting operation outside of the operating envelope.

2. The forestry machine of claim 1, wherein the operating envelope is defined by a plurality of allowed pitch and roll combinations.

3. The forestry machine of claim 2, wherein the operating envelope includes a limit point of a given pitch and a given roll where at the limit point an increase in roll at the given pitch would result in a mechanical interference between at least two parts of the forestry machine, wherein the controller is configured to automatically increase the roll and simultaneously reduce the pitch while passing through the limit point when directed by the command signal to increase the roll.

4. The forestry machine of claim 1, wherein the operating envelope comprises a borderline plot and the controller is configured to generate a control vector from the command signal, the pitch and the roll, the controller configured to control the leveling mechanism to move according to the control vector if the control vector is within the operating envelope.

5. The forestry machine of claim 4, wherein the controller is configured to control the leveling mechanism to gradually stop at an intersection of the control vector and the borderline plot when the control vector extends outside the borderline plot and is essentially perpendicular to the borderline plot.

6. The forestry machine of claim 4, wherein the controller is configured to control the leveling mechanism to operate along the borderline plot when the control vector extends outside the borderline plot and is not essentially perpendicular to the borderline plot.

7. The forestry machine of claim 4, wherein the controller is configured to determine a leveling mechanism speed from a length of the control vector, the controller configured to control the leveling mechanism to move at the leveling mechanism speed.

8. The forestry machine of claim 4, further comprising a rotation sensor that senses a rotary angle representing a rotary orientation of the cab relative to the carriage, wherein the controller is configured to receive the rotary orientation and rotate the control vector by the rotary angle.

9. The forestry machine of claim 1, wherein the controller is configured to decelerate the leveling mechanism as the operating envelope is approached.

10. The forestry machine of claim 1, further comprising at least one inclination sensor that determines the inclination of the turntable assembly relative to gravity, wherein the controller is configured to automatically control the leveling mechanism to maximally level the turntable assembly relative to gravity.

11. The forestry machine of claim 1, further comprising a rotation sensor that senses a rotary orientation of the cab relative to the carriage, wherein the controller is configured to receive the rotary orientation and control the leveling mechanism using the cab as a frame of reference.

12. The forestry machine of claim 1, wherein the first sensor is a roll sensor and the second sensor is a pitch sensor.

13. The forestry machine of claim 1, wherein the plurality of hydraulic cylinders includes a first hydraulic cylinder and a second hydraulic cylinder, the first sensor sensing a length of extension of the first hydraulic cylinder, which is the first parameter, and the second sensor sensing a length of extension of the second hydraulic cylinder, which is the second parameter.

14. The forestry machine of claim 1, wherein the controller is programmed with a set of kinematic equations, the controller configured to calculate the pitch and roll using the set of kinematic equations.

15. A method of controlling a forestry machine having a cab, an operator input device positioned in the cab, a boom, a forestry implement mounted to the boom, a swing-house assembly supporting the cab and boom, a turntable assembly supporting the swing-house assembly that is rotatable in relation to the turntable assembly, a carriage configured for off-road travel, a leveling mechanism mounted to the carriage and supporting the turntable assembly, the leveling mechanism including a plurality of hydraulic cylinders configured to reposition the turntable assembly relative to the carriage, the method comprising:
sensing a roll of the of the turntable assembly relative to the carriage;
sensing a pitch of the turntable assembly relative to the carriage;
receiving a command signal from the operator input device;
controlling the leveling mechanism in response to the command signal; and
keeping the leveling mechanism within an operating envelope stored in a controller by continuously monitoring the pitch and the roll.

16. The method of claim 15 wherein a current position of the leveling mechanism is defined by the roll and the pitch, the method further comprising determining a control vector based on the current position and the command signal, and controlling the leveling mechanism according to the control vector if the control vector is within the operating envelope.

17. The method of claim 16 wherein the operating envelope comprises a borderline plot, the method further comprising determining an intersection point with the borderline plot, monitoring a distance from the current position to the intersection point with the borderline plot and decelerating the leveling mechanism when approaching the intersection point.

18. The method of claim 17 wherein the leveling mechanism is gradually stopped at the intersection point if the control vector extends outside the borderline plot and is essentially perpendicular to the borderline plot.

19. The method of claim 17, wherein the leveling mechanism is operated along the borderline plot if the control vector extends outside the borderline plot and is not essentially perpendicular to the borderline plot.

20. The method of claim 16, wherein a speed of the leveling mechanism is proportional to a length of the control vector.

21. The method of claim 15, further comprising interpreting the command signal with the cab as a frame of reference for the command signal.

22. The method of claim 15, wherein the operating envelope includes a limit point of a given pitch and a given roll where at the limit point an increase in roll at the given pitch would result in a mechanical interference between at least two parts of the forestry machine, wherein the method comprises automatically increasing the roll and reducing the pitch while passing through the limit point when directed by the command signal to increase the roll.

* * * * *